United States Patent

[11] 3,584,190

[72] Inventor Leo Marcoux
    Rehoboth, Mass.
[21] Appl. No. 14,911
[22] Filed Feb. 27, 1970
[45] Patented June 8, 1971
[73] Assignee Texas Instruments Incorporated
    Dallas, Tex.

[54] SELF-REGULATING HEAT APPLICATOR
    5 Claims, 4 Drawing Figs.
[52] U.S. Cl............................................. 219/233,
    219/229, 219/241, 219/505, 228/51
[51] Int. Cl......................................... B23k 3/02,
    H05b 3/12
[50] Field of Search............................................. 219/229-
    —241, 221, 227, 242, 222, 504, 505; 228/51—55

[56] References Cited
    UNITED STATES PATENTS
    236,972    1/1881   Ball.............................. 219/233X
    2,768,275  10/1956  Kuhn et al. ................... 219/239
    2,861,163  11/1958  Asakawa....................... 219/505(UX)
    3,243,753  3/1966   Kohler.......................... 219/505(UX)
    3,518,407  6/1970   Andrich ........................ 219/241X
    FOREIGN PATENTS
    516,481    1/1931   Germany....................... 219/237

Primary Examiner—A. Bartis
Attorneys—Harold Levine, Edward J. Connors, Jr., John A. Haug, James P. McAndrews and Gerald B. Epstein ABSTRACT: A soldering iron is disclosed in which a self-regulating heating element is employed. In one embodiment the heating element is mounted within a cavity provided in the soldering tip in optimum heat transfer relation with the tip. The heating element is composed of a material having a steeply sloped positive temperature coefficient (PTC) of resistivity and locked into the tip cavity with a thermally conductive encapsulent. A thin layer of electrically insulative material may be provided separating the heater from the encapsulent. Means are provided to apply line voltage across the heating element causing a relatively high current inrush, due to the low resistance of the heater at room temperature, with a concomitant large quantity of generated heat until the anomaly temperature of the heater element is reached at which point the resistance rapidly increases to effectively decrease power generation, maintaining a balance between power dissipated and power generated. A second embodiment employs the heater element also as the applicator tip. One end of the heater element is formed with a pyramidic configuration, the outer portions of which are converted to an electrically insulating state and plated with a metallic surface to facilitate soldering. The heater is encapsulated in an insulating sleeve with the tip projecting therefrom. As in the previous embodiment, means are provided to apply line voltage across the heater element causing it to heat up.

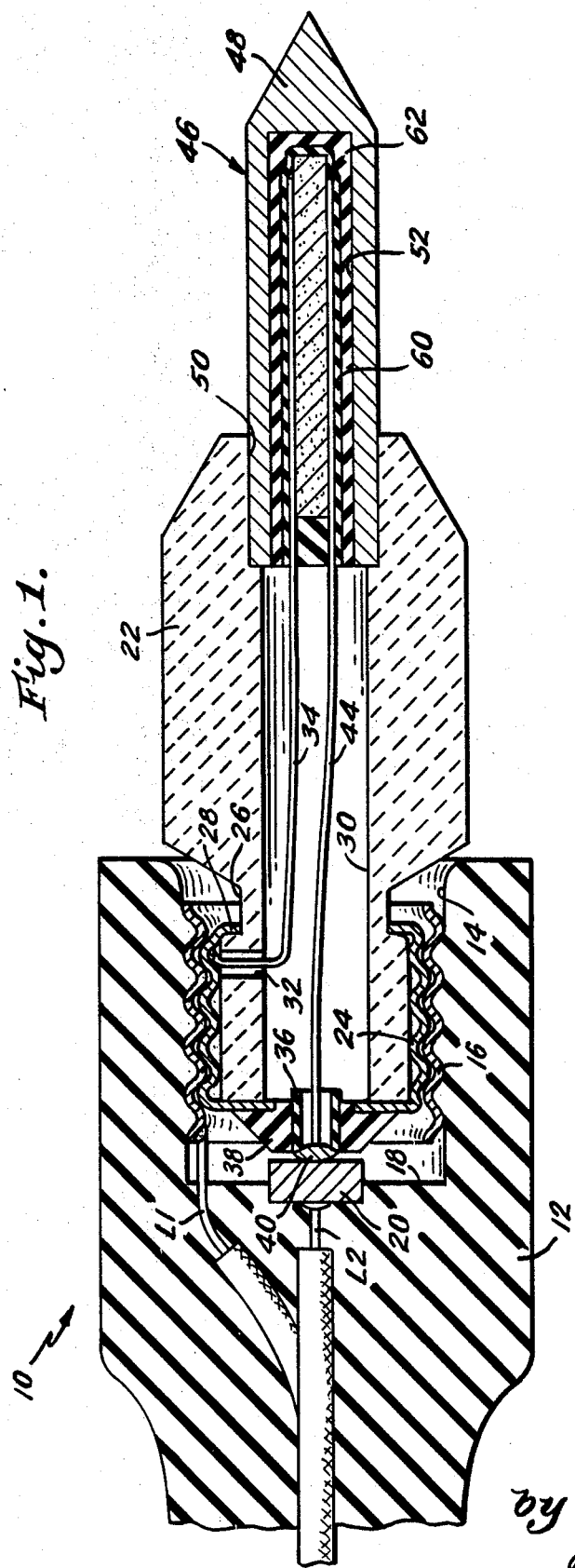

PATENTED JUN 8 1971

Inventor,
Leo Marcoux,
by John L. Haug Att'y.

SELF-REGULATING HEAT APPLICATOR

DESCRIPTION OF THE INVENTION

This invention relates to heat applicators and more particularly to self-regulating heat applicators. Heat applicators are well known in the art for a variety of uses, such as glue applicators, soldering irons, thermoplastic sealers and the like. For many such uses it is important that some temperature regulation be provided. In sealing thermoplastic bags, for instance, the temperature of the applicator must not be excessive or the thermoplastic material will be destroyed rather than merely melted to coalesce with an adjacent layer of the same material. When using a soldering iron, the temperature of the applicator tip must be maintained above the melting point of the particular solder used, but on the other hand, below temperatures which would deleteriously affect various temperature sensitive components which are being soldered.

Attempts to provide such devices have generally resulted in two types. The first has utilized an electro mechanical temperature controller as part of the heat applicator. Such devices, however, are cumbersome because of the bulkiness, unreliable due to moving parts and relatively expensive. A second type has utilized a solid-state electronic controller as part of the applicator. This can give very accurate, reliable temperature regulation; however, the cost of such a device is usually prohibitive for the end use of the device. As a result, for most applications, the operator has been relied on to provide the temperature regulation in an otherwise unregulated heat applicator. Essentially, such devices consist of a standard resistance heater thermally coupled to the applicator tip. The heater resistance level is selected so that the temperature of the tip is high enough to perform its function under the worst combination of line voltage variations, fabrication tolerances of the heater resistance and load variations. However, it can readily be seen that when the variations are in the opposite extreme, the tip temperature becomes excessive for many uses. This can be mitigated by using a voltage variable transformer in conjunction with the heat applicator which the operator can adjust to maintain the temperature at a desired level. This approach is unsatisfactory since it is not only expensive but it also depends on the skill of the operator for its effectiveness.

It is therefore an object of this invention to overcome the disadvantages of the prior art mentioned supra and to provide a simple, inexpensive, reliable heat applicator having temperature regulation.

Another object of the invention is the provision of a heat applicator which does not depend on the expertize of the operator to operate at optimum temperature levels and one in which excessive temperature levels are avoided under any and all conditions. Another object is the provision of a heat applicator which has inherent compensation for line voltage variations, one which has a short warmup time and a fast response time to lead variations.

The invention accordingly comprises the elements and combination of elements, features of constructions and arrangements of parts which will be exemplified in the structures hereinafter described, and the scope of the application of which will be indicated in the appended claims.

In the accompanying drawings in which two of the various possible embodiments of the invention are illustrated:

FIG. 1 is a cross section of a heat applicator made in accordance with a first embodiment of the invention with the handle thereof broken away;

FIG. 2 is an enlarged pictorial view of the heater element used in the FIG. 1 applicator;

Similar reference characters indicate corresponding parts throughout the several views of the drawings.

Figure 3:
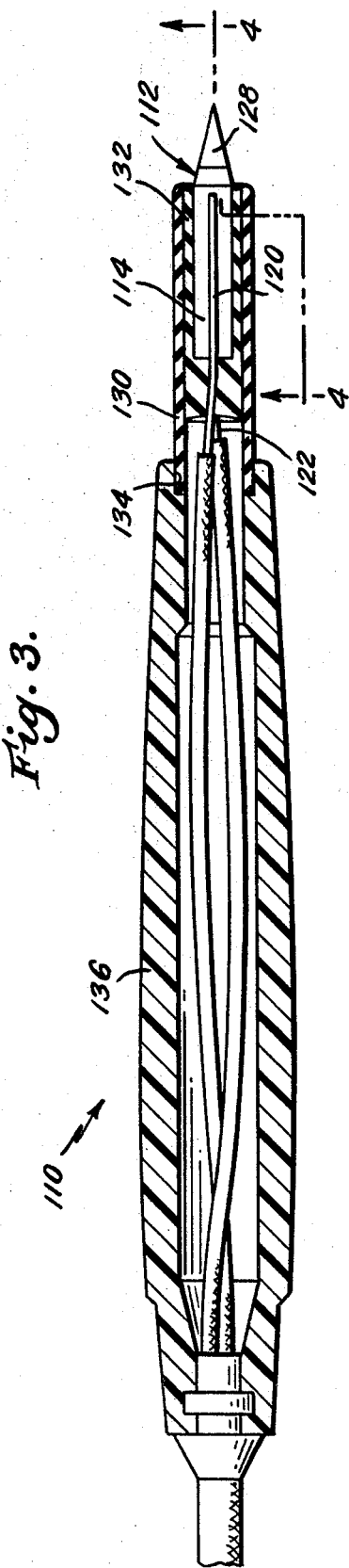
FIG. 3 is a cross section of a heat applicator made in accordance with a second embodiment of the invention.

Dimensions of certain of the parts as shown in the drawings have been modified or exaggerated for the purpose of clarity of illustration.

Turning to the drawings, numeral 10 indicates a heat applicator made in accordance with a first embodiment of the invention and comprises a handle portion 12, partly broken away in FIG. 1, formed of an electrically insulating material such as a conventional polymer. A bore 14 is provided in handle 12 in which a threaded sleeve 16 of electrically conductive material is located. Lead L1 is electrically connected to sleeve 16 in a conventional manner as by soldering. Mounted in the bottom wall 18 of bore 14 is electrically conductive member 20 to which is attached by suitable means, such as by soldering, lead L2.

Shank element 22 is provided with threaded sleeve member 24 at one end which is received in sleeve 16. A cut out portion 26 is preferably provided in shank 22 to facilitate attachment of sleeve 24, as by bending of the sleeve at 28, to clampingly engage the cut out portion 26. Shank 22 is preferably formed of an electrically and thermally insulative material, such as a ceramic, and is provided with an axially extending cavity 30 therein. Communicating with cavity 30 is an aperture 32 in the sidewall of shank 22 which permits access of lead 34 attached by conventional means, as by soldering, to sleeve 24. Eyelet 36 is carried by shank 22 electrically isolated from sleeve 24 as by glass ring 38. Bead 40 is mounted on eyelet 36 in such a manner that it will engage member 20 when shank 22 is screwed in handle portion 12. Lead 44 is electrically connected to bead 40 and extends into cavity 30 to heater/tip assembly 46.

The heater/tip assembly 46 comprises a pointed tip 48 formed of a good thermally conductive material, such as a copper alloy, and is received in seat 50 formed in shank 22 and is bonded into position with a high temperature cement such as marketed by Sauereisen Cements Company under the name "Sauereisen". Tip 48 has an aperture 52 therein for the reception of heater element 54. See FIG. 2 which shows the heater as a bar of material with leads 34 and 44 attached to spaced locations of the element. Element 54 is formed of material having a steeply sloped positive temperature coefficient (PTC) of resistivity above an anomaly or threshold temperature. Such material is known in the art and may, for instance, be a barium-lead titanate doped with a rare earth, such as lanthanum, to make it conducting. Contact layers 56,58 are attached to spaced portions of element 54 as by ultrasonic soldering, electroless nickel plating or flame spraying of aluminum and copper layers, as disclosed in copending and coassigned application (Docket No. 13639). Leads 34,44 are attached to contact layers 56,58 by conventional means, such as by soldering. A thin layer of electrical insulation 60, such as insulating tape 0.001—0.004 inches thick, sold by E. I. duPont deNemours & Co., Inc., under the name Kapton, is placed about element 54, or by coating or providing a boot in which the element is inserted. The assembly is locked into cavity 52 by encapsulent 62 of thermally conductive material such as a high temperature Sauereisen cement referenced above.

In a device made in accordance with the FIGS. 1,2 embodiment, a PTC heater element composed of barium-lead titanate and doped with lanthanum having an anomaly temperature of 230° C. was employed. When line voltage is applied to the PTC heater 54 via leads 34,44, the initial resistance of the heater at room temperature is approximately 120 ohms. The $I^2R$ heating quickly raises the temperature of the heater element and as the temperature increases up to the anomaly point, the resistance decreases to a low of 40 ohms. Once the anomaly point is reached, the resistance increases by several orders of magnitude within a few degrees of temperature with the result that the level of the temperature is limited to within a few degrees of that point.

Using 120 volts alternating current, the device initially draws approximately 120 watts; this increases to 360 watts shortly before the anomaly point is reached, and once steady state conditions are reached in the unloaded condition (in about 2 minutes), approximately 8 watts are drawn.

As it is subjected to a load, heat will be drawn out of the applicator. This tends to lower the temperature and hence the resistance decreases which causes an increase in current, and hence heat generation. This offsets the heat taken from the applicator and tends to prevent a decrease in the temperature of the applicator. It will be seen that there is a dynamic balancing of heat dissipation with heat generation, but due to the steepness of the PTC characteristic, there is very little change in temperature in the operating region of the applicator since, as mentioned above, the resistance changes several orders of magnitude within a few degrees in the anomaly region.

As a result of this heater characteristic, the heater can be chosen with an anomaly temperature selected for a particular use (e.g., a particular type of solder having a melting point of a known value). Thus the heater for the applicator tip can be selected so that the temperature of the applicator will never be high enough to oxidize itself or the solder. This obviates the need for continuous cleaning of the tip due to excessive temperature which is so common with prior art devices. Further, resin core flux can be used since the resin will not be burned off due to excessive temperatures and a flux coating will remain on the tip.

Another advantage to be noted is that voltage variations have very little affect on the anomaly temperature due to the steepness of the PTC characteristic. Thus, voltage variations do not cause the extreme fluctuations in temperature which is one of the problems associated with prior art applicators as mentioned above.

Figure 4:
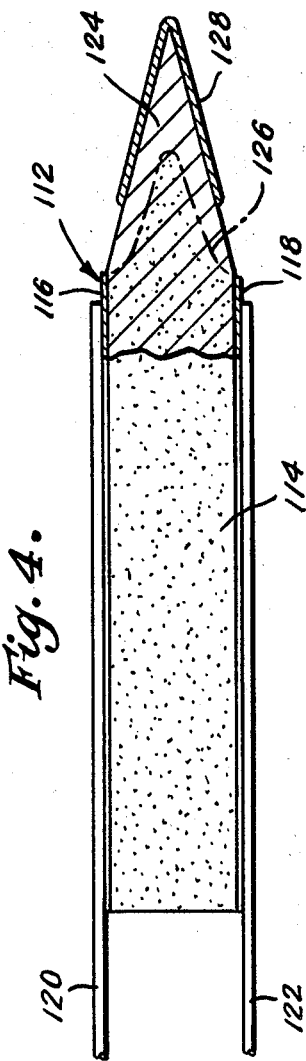
FIG. 4 is an enlarged cross section of the heater/tip assembly of the FIG. 3 applicator.

In FIGS. 3 and 4 another embodiment of the invention is depicted. In this embodiment, the soldering iron 110 employs a heater/tip assembly 112 in which element 114 serves the function of a heater as well as the tip. Element 114 is formed of the same material as element 54 in the FIG. 1,2 embodiment. Contact layers 116,118 are attached to two opposite sides of the element, as by ultrasonic soldering, or flame spraying, as set forth supra and leads 120,122 are attached by conventional means, as by soldering, respectively, to contact layers 116,118.

Instead of forming the PTC material in the shape of a parallelepiped, as in the first embodiment, one end 124 is shaped in the form of a pyramid. This is done using conventional pressing techniques, pressing the PTC material in powder form into the desired configuration prior to firing. The outer portion of the portion 124 is preferably treated to remove the PTC characteristic, making the material an electrical insulator in that region. As seen in FIG. 4, boundary line 126 depicts the demarcation of the PTC region and the electrical insulating region. This may be accomplished by precipitating in situ in the pores of the portion 124 region a ferric compound which has the effect of increasing the electrical resistivity of that portion of the material.

More specifically, one way of accomplishing the passivation is as follows: element 114 is masked by any suitable means, except for the portion 124. The element is then immersed in a solution of ammonium hydroxide until its pores become saturated, and then it is immersed in ferric chloride which reacts with the ammonium hydroxide to precipitate in situ insoluble ferric hydroxide onto the walls of the pores. The resulting element is then fired to effect sintering and to incorporate the insoluble ferric compound into the lattice of the substrate. Further details may be gleaned from copending, coassigned application Ser. No. 788,019, filed Dec. 30, 1968.

To effect a better soldering surface, a coating 128 of suitable metal may be applied, as by flame spraying, onto portion 124. Element 114 is mounted in tubular member 130 by encapsulent 132 of electrical and thermal insulation. Tubular member 130 is received and bonded in seat portion 134 of handle 136.

Due to the elimination of the thermal resistance of the intermediate heat transfer member, the second embodiment heats up faster and has the capability of reacting to lead variations more quickly. A higher tip temperature is obtained for a given PTC material since there is no thermal drop of an intermediate heat transfer member. Still other advantages are obtained in that a more compact, streamlined unit can be made using a minimum of thermal insulation and having lower steady state power.

Thus it will be seen that all the objects of the invention are fulfilled.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. In a heat applicator, an applicator tip, a heater element mounted in heat transfer relation to the applicator tip, the heater element and tip comprising a unitary member composed of material having a steeply sloped positive temperature coefficient of resistivity above an anomaly temperature, at least the surface of said tip being treated to render it electrically nonconductive, and means to apply a voltage across the element causing electrical current to flow through the element, thereby causing the element to heat up to its operating temperature.

2. An applicator according to claim 1 in which the means to apply a voltage across the element includes layers of conductive material attached to spaced portions of the element and an electrical lead attached to each layer.

3. A heat applicator according to claim 1 in which said member is mounted in a tubular shank attached to a handle, the heater element portion of the member being inserted into the tubular shank with the tip extending beyond the shank and encapsulating material is lockingly inserted between the heater element and the shank.

4. A heat applicator according to claim 1 in which the tip is pyramidical.

5. A heat applicator according to claim 1 in which at least a portion of the surface of the tip is coated with a metal layer.